March 2, 1965     W. F. DAHLBERG     3,171,270
TORQUE LIMITING CLUTCH
Original Filed Oct. 24, 1960     3 Sheets-Sheet 1
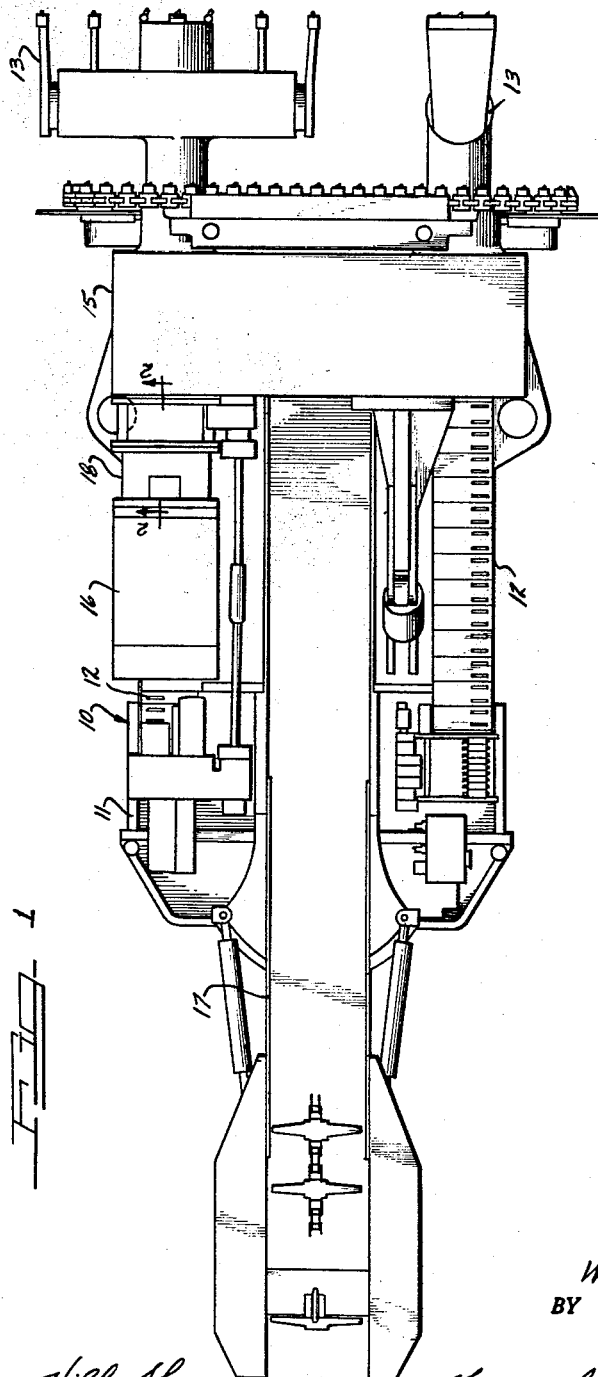
INVENTOR.
William F. Dahlberg
BY
Hill, Sherman, Meroni, Gross & Simpson Attorneys

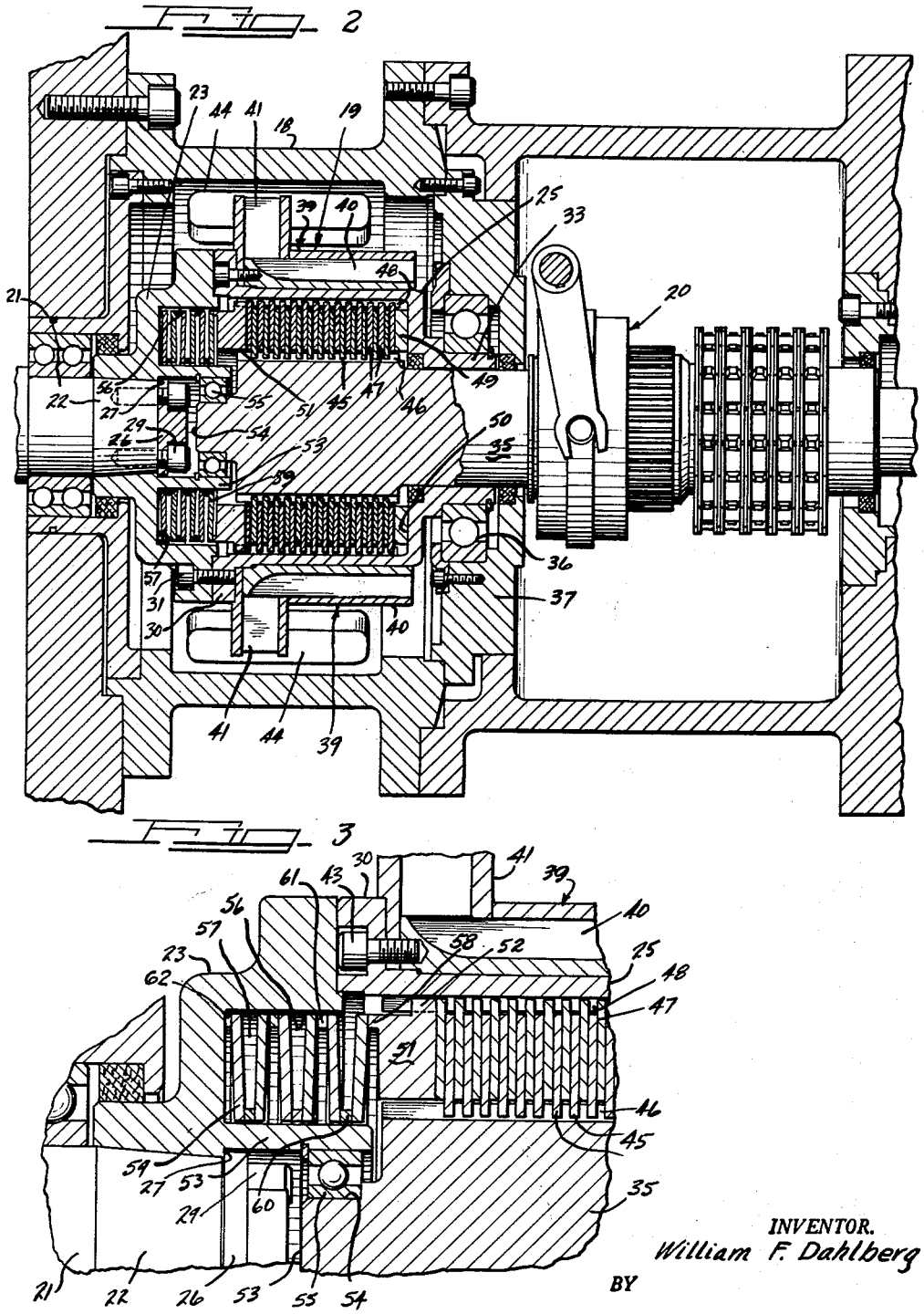

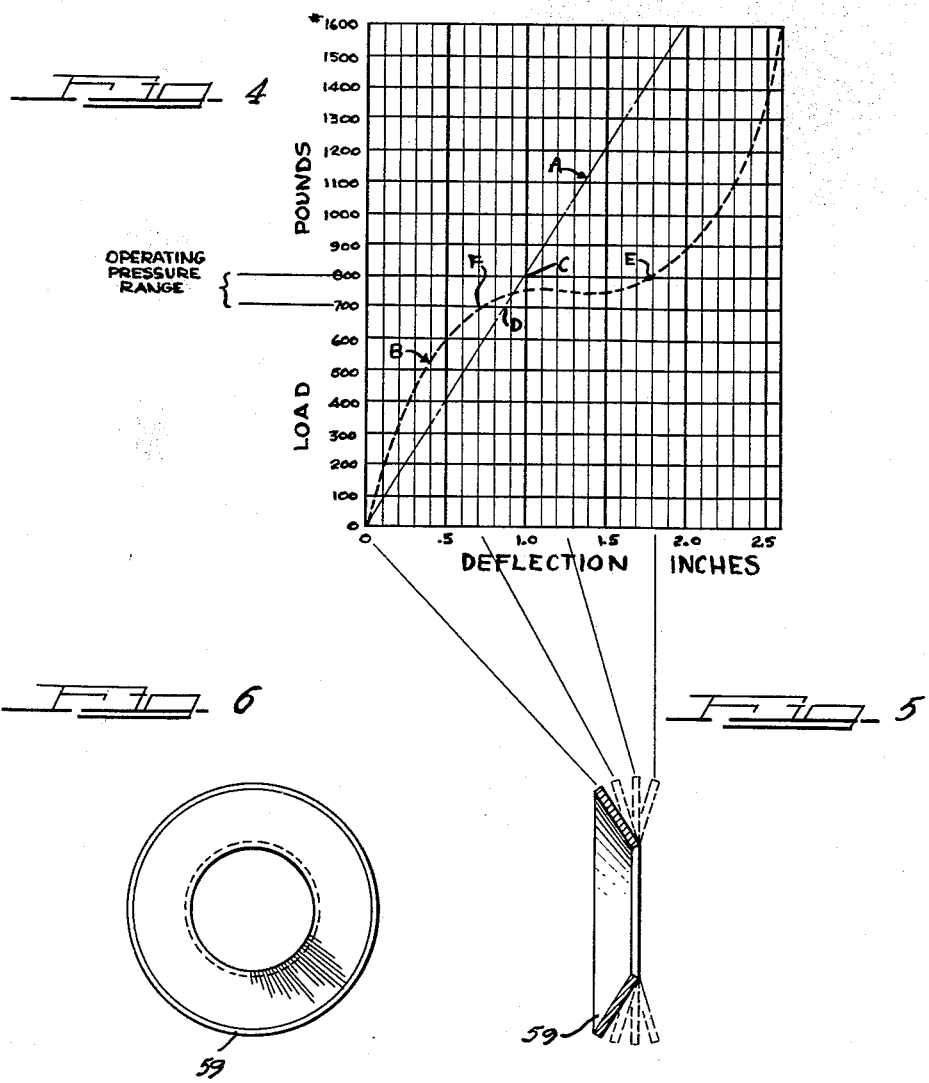

United States Patent Office 3,171,270
Patented Mar. 2, 1965

3,171,270
TORQUE LIMITING CLUTCH
William F. Dahlberg, Chicago, Ill., assignor to Goodman Manufacturing Company, Chicago, Ill., a corporation of Illinois
Continuation of application Ser. No. 64,635, Oct. 24, 1960. This application Feb. 25, 1963, Ser. No. 260,810
4 Claims. (Cl. 64—30)

This invention relates to improvements in torque clutches of the friction disk type and more particularly relates to such clutches as are adapted to carry the heavy drive loads of the boring heads of continuous mining machines and the like.

This application is a continuation of my copending application Serial Number 64,635, filed October 24, 1960 and entitled "Torque Limiting Clutch" and now abandoned.

Heretofore, torque clutches used in the drives to the boring heads of continuous mining machines have been loaded by yieldably urging an annular pressure plate against the friction disks of the clutch through a plurality of compression springs carried on a backing plate for the clutch. The torque capacity of the clutch is dependent upon the compression of the springs which is varied by individual adjusting screws for each spring, bearing on abutments in which the springs are seated.

With such clutches each of the compression springs must be individually adjusted to the same load value and the range of adjustment of the springs to properly load the clutch is considerably less than the life of the clutch disks, with the result that when the springs can no longer be adjusted, the disks of the clutch are not warn out and additional disks must be added to bring the clutch up to the proper load capacity.

The adjustment of the clutch itself particularly when installed on a continuous mining machine operable underground is a difficult and time consuming operation and must be repeated for each adjustment made on the clutch.

Also due to the difficulty in adjusting the clutch underground, after the clutch requires adjustment, the clutch is frequently adjusted so tightly that it acts as a solid member and does not properly perform its function of relieving the boring heads from excess torque loads.

A principal object of the present invention is to provide a torque clutch of a type used in the drive to the boring heads of a continuous mining machine, which requires no adjustment during the life of the clutch disks after the clutch has initially been adjusted when assembled.

A further object of the invention is to provide a simple and efficient torque clutch utilizing spring means having sufficient travel to uniformly load the friction disks of the clutch for the life of the disks.

Still another object of the invention is to provide a simple and improved form of friction disk torque clutch utilizing coned disk springs to load the friction disks of the clutch and by arranging the coned disk springs in series and spacing the disk springs apart at their inner and outer peripheries by spacer rings, to provide sufficient travel of the springs and pressure plate of the clutch to maintain the load on the friction disks of the clutch substantially uniform throughout the life of the friction disks.

These and other objects of the invention will appear from time to time as the following specification proceeds and with reference to the accompanying drawings wherein:

FIGURE 1 is a plan view of a continuous mining machine of the boring type, in which the boring heads of the mining machine are driven through a clutch constructed in accordance with the invention;

FIGURE 2 is a partial fragmentary sectional view looking substantially along line 2—2 of FIGURE 1, in order to show the clutch and the driving and driven members therefore, with certain parts of the clutch broken away and certain other parts of the clutch shown in section;

FIGURE 3 is an enlarged partial fragmentary sectional view taken through the clutch shown in FIGURE 2;

FIGURE 4 is a graph comparing the load deflection curve of the coned disk springs utilized in the clutch of the invention with the load deflection curve of the coil springs heretofore used;

FIGURE 5 is a sectional view of a coned disk spring and showing in dotted the deflection of the spring for various loadings thereon; and FIGURE 6 is a plan view of the coned disk spring shown in FIGURE 5.

Referring now to FIGURE 1 of the drawings, 10 generally designates a continuous mining machine of the boring type including a main frame 11 supported on laterally spaced continuous traction tread devices 12, which serve to transport the machine along the ground from working place to working place and to feed boring heads 13, rotatably mounted on gear casing 15 and projecting forwardly therefrom, to advance said boring heads to cut contiguous bores in the working face of a mine.

The gear casing 15 also has a motor 16 mounted thereon and extending rearwardly therefrom and movable with the gear casing 15 upon adjustable movement of said gear casing. The motor 16 extends along one side of a conveyor 17, for picking up the mined material and conveying it to the rear of the machine, and has an end housing 18, secured to the end plate thereof and projecting forwardly therefrom, and forming a housing for a torque clutch 19. The torque clutch 19 has operative connection with the gearing (not shown) in the gear casing 11, for driving the boring heads 13 through a selectively shiftable clutch 20, which may be a jaw or pin type of clutch and is no part of the present invention, so need not herein be shown or described further.

A power shaft 21, which may be the shaft of the motor 16, extends within the housing 18 and has a tapered inner end portion 22, on which is mounted an end housing 23 of a clutch casing 25. The end housing 23 may be keyed or otherwise secured to the tapered end portion 22 of the shaft 21 and is retained thereto by a cap 26 abutting the end of the shaft 22 and a shouldered portion 27 of the end housing 23, and secured thereto as by cap screws 29.

The end housing 23 abuts an outwardly extending flanged portion 30 of the clutch casing 25 and is secured thereto as by cap screws 31.

The casing 25 has a hub portion 33 through which extends a shaft 35, which may be freely rotatable with respect to said hub portion. The hub portion 33 is journalled on its outer periphery on a ball bearing 36 carried in an end plate 37 for the housing 18.

The clutch casing 25 also has a plurality of impellers 39 extending therealong and projecting radially therefrom. As shown in FIGURES 2 and 3, the impellers 39 are in the form of air conduits 40 extending axially along the outer wall of the casing 25 and having fluid communication with conduits 41 extending radially of the outer wall of the casing 25 and outwardly therefrom. The impellers 39 abut the inner wall of the flange 30 and are secured thereto as by cap screws 43 extending through the flange 30 and threaded within the axial and radially extending conduits 40 and 41.

The housing 18 is shown in FIGURE 2 as having a plurality of open portions 44 therein opening through the wall of said housing and communicating with the atmosphere and accommodating air circulated by the centrifugal action of the impellers 39 to be drawn into the open ends of the conduits 40 and to be discharged through the radial conduits 41 and open portions 44 of said housing.

It should here be noted that the impellers 39 continuously rotate as long as the shaft 21 is driven and, therefore, having a cooling effect on the clutch when the clutch is slipping.

Internally splined clutch disks 45 have driving engagement with a splined portion 46 of the shaft 35. Between the disks 45 are clutch disks 47 having toothed or splined outer peripheries having slidable engagement with splines 48 extending inwardly of the interior cylindrical wall of the clutch casing 25. An annular ring 49 abuts an inner end wall 50 of the clutch casing 25 and is abutted by an inner end disk of the friction clutch disks. An annular pressure plate 51 has an externally splined portion 52 having slidable engagement with the splines 48 and abuts an outer end friction disk of the friction disks 45 and 47.

The end housing 23 has an inner cylindrical wall portion 53 extending from the shoulder 27 and along a reduced end portion 54 of the shaft 35 and forming a support for an anti-friction bearing 55 journalling the inner end of the shaft 35 in the end housing 23. The space between the annular wall 53 and an internal wall 56 of the end housing 23 forms an annular spring chamber 57 for a plurality of coned disk springs 59 arranged in series.

As shown in FIGURE 3, the inner coned disk spring abuts an axially extending annular flange 58 of the pressure plate 51 at its large diameter end. The coned disk springs 59 are spaced apart at their inner or small diameter ends by spacer rings 60 extending about the outer wall of the cylindrical wall portion 53 of the end housing 23. Spacer rings 61 space the coned disk springs 59 apart at their large diameter ends. A spacer ring 62 spaces the peripheral portion of the outer coned disk springs 59 from the inner wall of the end housing 23.

The annular flange 58 and spacer rings 60, 61 and 62 make it possible to load the coned disk springs 59 to the upper end of the operating pressure range of the clutch, when the end housing 23 is tightened into engagement with the outer face of the flange 30 of the casing 25, by the cap screws 31. The clutch is thus in adjustment when assembled, and due to the travel of the coned disk springs 59 in the operating range of the clutch made possible by spacing the coned disk springs apart at their inner and outer margins by the spacer rings 60 and 61, the clutch need not be adjusted during the life of the friction disks 45 and 47. When the friction disks 45 and 47 become worn out, the clutch is disassembled and the worn friction disks are replaced with new disks. The clutch may then be assembled, using the same coned disk springs and loading said springs in the manner hereinbefore described.

Referring now in particular to FIGURES 4, 5 and 6, curve A in FIGURE 4, is a load deflection curve of the coil springs formerly required to load a torque clutch of the capacity of the torque clutch of the present invention.

Curve B is a load deflection curve of the series arranged coned disk springs of the present invention, and FIGURE 5 is a diagrammatic view showing the deflection of the individual coned disk springs in the operating pressure range of the clutch in dashed lines.

It will be noted from FIGURE 4, that where the operating pressure range of the clutch is from 700 to 800 pounds, that the travel of the coil springs within this operating range, as indicated by curve A will be from point C to point D. This is shown in curve A as being substantially .15 inch. The compression springs must thus each be individually adjusted when the clutch disks have worn a greater amount than the .15 inch travel of the springs.

In loading the coned disk springs of the present invention, the springs are loaded to point E on curve B, one spring of each pair of springs being in the extreme dotted line position shown in FIGURE 5 and the adjacent springs being in similar opposite positions. The travel of the springs within the operating pressure range of the clutch will be from point E to point F, which is a travel of substantially 1.1 inches. This is sufficient travel to make it possible to efficiently operate the clutch in its operating pressure range until the clutch disks are entirely worn out. Thus, with coned disk springs, it is never necessary to adjust the clutch until the clutch disks are completely worn out, at which time the disks are replaced with new disks and the coned disk springs are loaded by securing the end casing member 23 into abutting engagement with the flange 30 of the casing 25.

It may be seen from FIGURES 4 and 5 that at point E the coned disk springs are loaded beyond their center points. This is the deflection of the coned disk springs when the clutch is initially assembled with new friction disks. This loading of the series arranged coned disk springs to be deflected beyond their center points is made possible by the spacer rings 60 and 61 in cooperation with the spacer ring 62 and the axial flange 58 spacing the disk springs apart and from the wall of the housing 23 and the pressure plate 51 and thereby avoiding interference or locking between the individual coned disk springs and enabling the series arranged coned disk springs to be deflected beyond their center or flat positions.

It should here be noted that while the shaft 21 is shown as being the driving member for the clutch, that the shaft 35 could be the driving member as well.

While I have herein shown and described one form in which my invention may be embodied, it may readily be understood that various modifications and variations in the invention may be attained without departing from the spirit and scope of the novel concepts thereof as defined by the claims appended hereto.

I claim as my invention:

1. In a torque limiting overload relief clutch,
   a driving member,
   a driven member,
   a friction slip drive from said driving member to said driven member comprising a plurality of friction disks and an abutment engaged by an end disk of said friction disks,
   a pressure plate engaging an opposite end disk of said friction disks,
   means preloading said friction disks to a predetermined operating pressure range comprising a plurality of coned disk springs arranged in series,
   spacer means on said pressure plate engaged by an outer end portion of one of said coned disk springs and spacing said spring from said pressure plate a distance sufficient to accommodate deflection of said spring past center upon the exertion of pressure thereon,
   means spacing the inner and outer end portions of said springs apart,
   a pressure member,
   a spacer on said pressure member facing said coned disk springs and engaging an outer edge portion of an end coned disk spring opposite from said pressure plate,
   and means drawings said pressure member toward said pressure plate to deflect said coned disk springs beyond a center position at the high part of the operating pressure range of said clutch and retaining said pressure member in fixed spaced relation with respect to said pressure plate and thereby maintaining said springs loaded in the operating pressure range of said clutch.

2. In a torque limiting overload relief clutch,
a driving member including a casing having an internally splined inner wall portion,
a driven member including a shaft extending within said casing and journalled for rotation with respect thereto and having an externally splined portion,
a friction slip drive connection between said driving member and said driven member including a plurality of abutting friction disks alternately splined to the splined portions of said casing and shaft,
said casing having an end wall forming an abutment for an end disk of said friction disks,
an annular pressure plate movably mounted within said casing engageable with an opposite end disk from said end wall,
an end housing for said casing forming a drive member therefor,
and means loading said disks to slip at predetermined torque loads on said shaft comprising a series of coned disk springs interposed between said pressure plate and end housing and arranged coaxially with said shaft in series relation with respect to each other,
and inner and outer spacer rings spacing said coned disk springs apart at their inner and outer margins a distance sufficient to enable said springs to be deflected past center comprising means retaining said end housing to said casing,
and spacing said end housing from said pressure plate a distance sufficient to maintain said coned disk springs loaded in the operating pressure range of the clutch.

3. In a torque limiting overload relief clutch,
a driving member including a casing having an internally splined inner wall portion,
a driven member including a shaft extending within said casing and journalled for rotational movement with respect thereto and having an externally splined portion within said casing,
a friction slip drive connection between said casing and said shaft including a plurality of alternately arranged internally and externally splined friction disks splined to the splined portions of said casing and shaft,
said casing having an inner end wall forming an abutment member for said disks,
an annular pressure plate spaced from said inner end wall and engageable with an opposite end friction disk from said wall,
means loading said friction disks to a predetermined operating pressure range including a plurality of coned disk springs arranged in series coaxially of said shaft,
annular spacer means on said pressure plate engageable with an outer marginal portion of an inner disk spring of said coned disk springs and spacing said spring from said pressure plate a distance sufficient to accommodate the deflection of said springs past center,
means spacing the inner and outer marginal portions of said springs apart distances sufficient to accommodate deflection of said springs past center, and a closure member for said casing having spacer means thereon engaging an outer marginal portion of an outer disk spring of said coned disk springs and spacing said springs from said closure plate a distance sufficient to accommodate the deflection of said spring over center with respect to a flat condition,
and means securing said closure member to said casing and maintaining a predetermined deflection of said coned disk springs and thereby loading said coned disk springs in the operating pressure range of the clutch and maintaining said springs in this loaded condition.

4. In a torque limiting overload relief clutch,
a driving member including a casing having an internally splined inner wall portion,
a driven member including a shaft extending within said casing and journalled for rotational movement with respect thereto and having an externally splined portion within said casing, a friction slip drive connection between said driving member and said driven member comprising a plurality of alternately arranged internally and externally splined friction disks alternately splined to the splined portions of said casing and shaft,
said casing having an inner end wall forming an end abutment for said friction disks,
an annular pressure plate engageable with an opposite end friction disk from said abutment,
a closure member for said casing,
a shaft secured to said closure member coaxially of said first mentioned shaft and forming a drive member for said closure member and casing,
said closure member having a spring chamber therein coaxially of said shafts and having an annular wall spaced from and facing said pressure plate,
means for loading said friction disks to slip at predetermined torque loads comprising a plurality of coned disk springs arranged in series in said chamber and loaded by said closure member,
spacer means spacing the outer peripheral portion of the outermost coned disk spring from said annular wall,
spacer means spacing the outer peripheral portion of the innermost coned disk spring from the face of said pressure plate,
and inner and outer spacer rings in said spring chamber spacing the inner and outer marginal portions of said coned disk springs apart,
said spacer rings and spacer means spacing said springs apart distances sufficient to accommodate the deflection of said springs past a flat center condition and providing sufficient travel of said springs to accommodate loading of said springs to the operating pressure range of said clutch, and means securing said closure member to said casing and maintaining said closure member in securing engagement with said casing to deflect said springs to the maximum pressure of the operating pressure range thereof.

References Cited in the file of this patent
UNITED STATES PATENTS

| | | |
|---|---|---|
| 1,635,353 | Alley | July 12, 1927 |
| 1,742,804 | Carhart | Jan. 7, 1930 |
| 2,096,981 | Schjolin | Oct. 26, 1937 |
| 2,219,139 | Nutt et al. | Oct. 22, 1940 |
| 2,890,773 | Martindell | June 16, 1959 |
| 2,977,779 | Steinke et al. | Apr. 4, 1961 |